Dec. 8, 1959     H. B. McMULLIN     2,916,298
AIR SUSPENSION MEANS FOR VEHICLES
Filed Oct. 2, 1957     2 Sheets-Sheet 1

Inventor
Harold Breniman McMullin
by M. Talbert Dick
Attorney

Witness

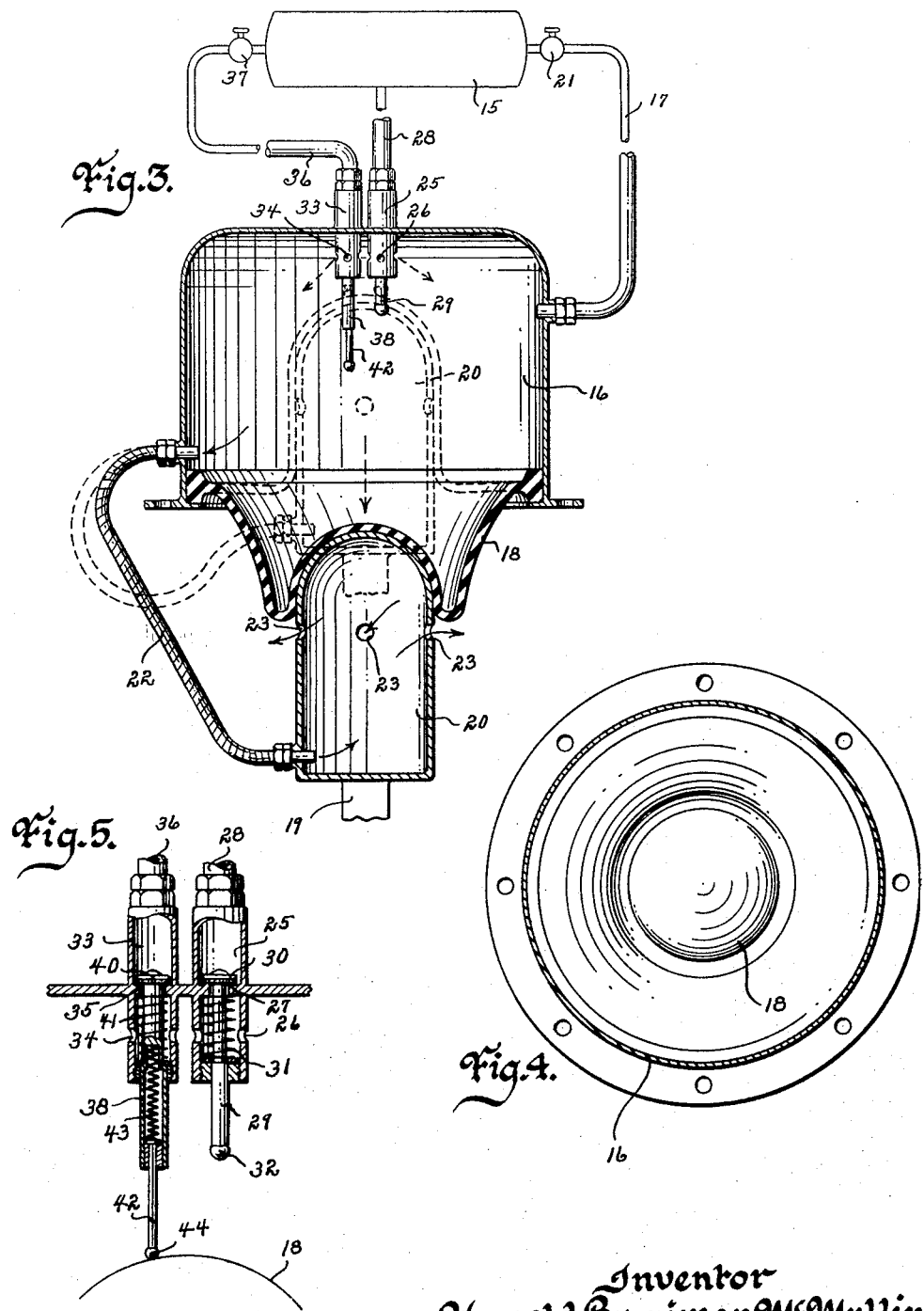

United States Patent Office 2,916,298
Patented Dec. 8, 1959

2,916,298

AIR SUSPENSION MEANS FOR VEHICLES

Harold Breniman McMullin, Brooklyn, Iowa

Application October 2, 1957, Serial No. 687,726

6 Claims. (Cl. 280—124)

This invention relates to resilient suspension means for automotive vehicles and more particularly to devices using compressed air as the resilient means.

Engineers have for some time recognized that the best means for supporting the chassis of a vehicle on wheeled axles is confined compressed air. Most automotive vehicle manufacturers are proceeding to manufacture their automobiles with air suspension means. In general, such equipment consists of a compartment of compressed air having at least a section of rubber or like flexible material in engagement with a piston arm connected to the vehicle running gear and with the compartment secured to and supporting the upper chassis of the vehicle. While the idea of an air ride is most intriguing, a serious problem develops in dampening the reciprocation of the piston arm in both directions. To my knowledge this problem has not heretofore been solved. The problem exists due to the constant air pressure being maintained in the compartment during the reciprocation of the piston arm. The situation is similar to that of the old type metallic vehicle springs before the advent of shock absorbers.

Therefore, one of the principal objects of my invention is to provide a means for progressively dampening the reciprocating piston arms of air suspension means.

More specifically, the object of this invention is to provide a control method for air suspension means whereby the movement of the piston arm increases or decreases the air pressure in the air compartment.

A further object of my invention is to provide a control means for air suspension systems that is controllably sensitive in operation.

Still further objects of my invention are to provide an air suspension means for automotive vehicles that is economical in manufacture and durable in use.

These and other objects will be apparent to those skilled in the art.

Figure 1:
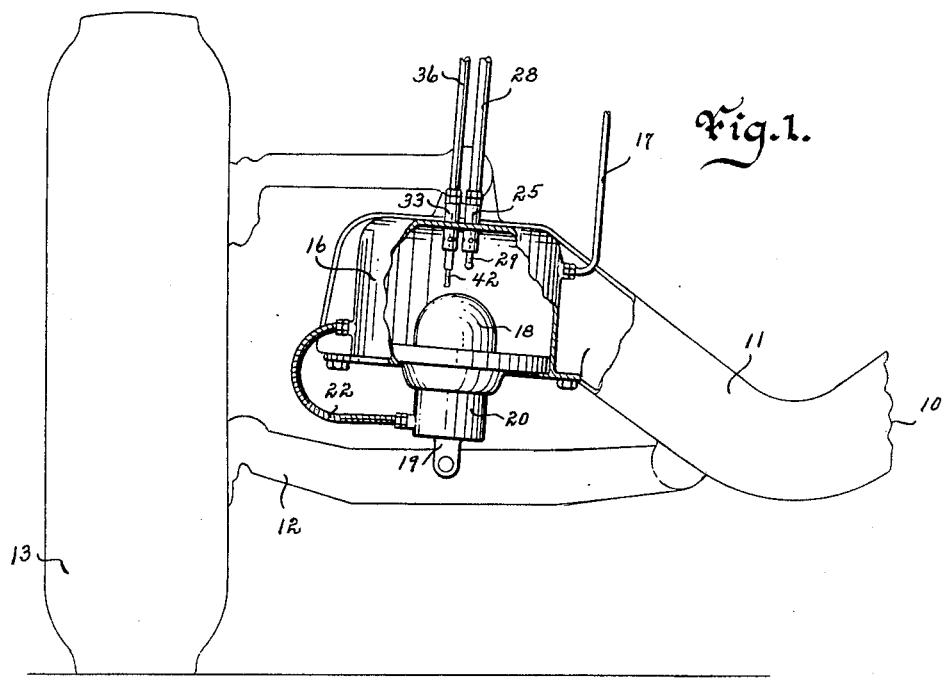
Figure 2:
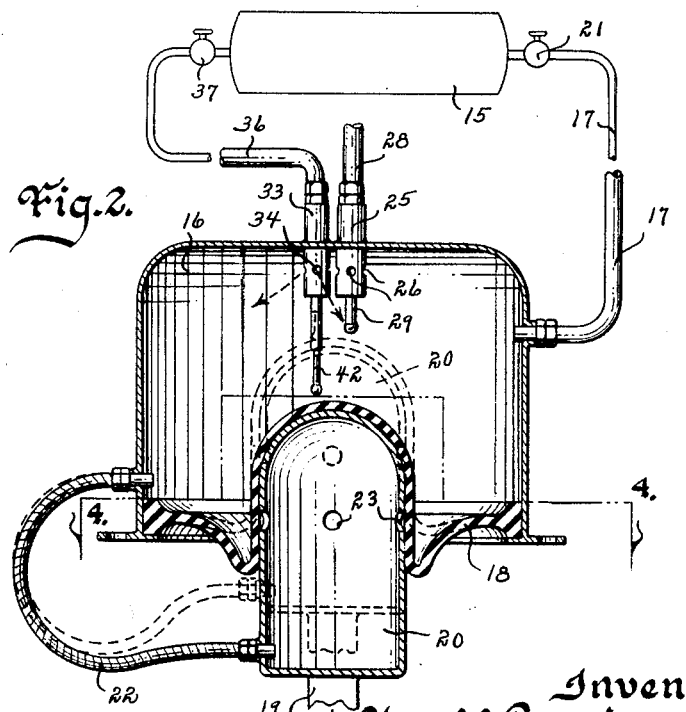

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a front sectional view of my device in use on a vehicle,

Fig. 2 is an enlarged sectional view of my unit and more fully illustrates its construction, Fig. 3 is an enlarged sectional view of the device and illustrates the method of expelling excessive air pressures, Fig. 4 is an enlarged top sectional view of the inside bottom area of the air pressure compartment and is taken on line 4—4 of Fig. 2, and Fig. 5 is an enlarged side sectional view of my double air inlet valves.

In these drawings I have used the numeral 10 to generally designate an automotive vehicle having the chassis 11, and axle 12 hinged at one end to the chassis and supported at its other end by the wheel 13. In air suspension means there is an air pressure supply tank 15, communicating with a tank compartment 16 via a pipe conduit 17. This tank compartment is secured to the vehicle chassis and positioned between the chassis and the axle 12, as shown in Fig. 1. The top and sides of this tank compartment are of metal, but the bottom 18 is of flexible resilient material, such as rubber or like. The numeral 19 designates the piston arm secured to the axle and having a hollow dome portion 20 at its top, engaging the rubber-like bottom 18, and causing that bottom to extend over and around the upper portion of the dome portion 20, as shown in Fig. 2. The numeral 21 designates, in symbol, a pressure regulator valve means imposed in the pipe conduit 17. With an air pressure in the tank compartment 16, the same will yieldingly bear on the top of the rubber bottom 18 and thus yieldingly hold the piston arm downwardly, which in turn will yieldingly support the chassis on the wheel axle and wheel. Obviously, several tank compartments are used on each vehicle but inasmuch as they are all identical with each other, I will only show and describe one complete unit.

Firstly, I install a flexible conduit 22, having one end communicating with the inside of the tank compartment 16 and its other end communicating with the inside bottom of the hollow dome portion 20. Secondly, I form air exit passageways 23 in the side wall of the dome portion 20 and which are normally closed by the overlapping of the rubber bottom 18 as shown in Fig. 2. If the piston arm is lowered materially relative to the tank container, these exhaust passageways 23 will be exposed to the outside atmosphere as shown in Fig. 3. Thirdly, I use an auxiliary valve means and which I will now describe in detail.

The numeral 25 designates a valve housing extending downwardly vertically into the tank compartment and in a vertical plane above the dome portion 20. This valve housing has outlet passageways 26 inside the tank compartment, and a valve seat 27. This valve housing is connected to the inside of the supply tank 15 by the pipe 28. The numeral 29 designates a valve stem reciprocatively mounted in the valve housing, having a valve head 30 capable of seating on the valve seat 27. The numeral 31 designates a coil spring in the valve housing for yieldingly holding the valve stem in a lowered position and the valve head in a closed position onto the valve seat 27. The valve stem extends downwardly in the tank compartment and beyond the valve housing. The numeral 32 designates a rounded head on the lower end of the valve stem.

The numeral 33 designates a second valve housing extending through the top of the tank compartment, adjacent the valve housing 25 and also in a vertical plane above the dome portion 20. This valve housing has air outlet passageways 34 communicating with the inside of the tank compartment and a valve seat 35. The numeral 36 designates a pipe having one end communicating with the inside of the valve housing 33 and its other end communicating with the inside of the air supply tank 15. The numeral 37 designates, in symbol, an air pressure regulating valve imposed in the pipe 36. The numeral 38 designates a valve stem cylinder slidably mounted in the valve housing 33 and having a valve head 40 capable, when in a lowered position, of seating onto the valve seat 35. The numeral 41 designates a coil spring in the valve housing 33 for yieldingly holding the valve stem cylinder 38 in a lowered position and its valve head in engagement with the valve seat 35. This valve stem cylinder extends downwardly into the tank compartment. Slidably mounted in the valve stem cylinder is a valve stem 42. The numeral 43 designates a strong coil spring inside the valve stem cylinder, yieldingly holding the valve stem 42 in a downward position. This spring 43 is substantially stronger than the spring 41. By this arrangement of parts the second valve means is a telescoping valve and extends to a position much lower than the first valve means, as shown in Fig. 5. The numeral 44 designates a rounded head on the lower end of the valve stem 42.

The practical operation of my device is as follows. The air supply tank 15 will normally have a supply pressure of air much greater than that of the air pressure inside the tank container 16, due to the pressure regulator 21. Also, normally the air pressure inside the tank container and the inside of the dome portion 20 will be substantially the same by virtue of the connecting pipe 22. The pressure regulator 37 is adjustably set to furnish air to the inside of the tank container at a greater pressure than that delivered by the pipe 17. Therefore, if the vehicle wheel strikes a bad bump on the roadway, the dome portion 20 will be forced upwardly, thereby raising the central area of the rubber-like bottom 18, which will in turn contact the valve stem 42, and open its valve, thereby introducing a greater air pressure into the tank container through the pipe 36. This greater air pressure will add immediately to the yielding force holding the piston arm downwardly. This action is shown in Fig. 2. With the dome portion 20 finally being overcome in its relative upward movement, it will move downwardly and back to a normal position. If too much air pressure is introduced into the tank container, or if the rebound of the piston arm is severe, the relative lowering of the dome portion 20 will expose its exhaust holes 23 from under the overlying bottom 18, as shown in Fig. 3. When this occurs the excessive air pressure inside the tank compartment will be relieved and the dome portion will resume its normal position with its passageway 23 closed as shown in Fig. 2. Therefore, the telescoping valve unit will change the air pressure inside the tank container when needed to iron out or snub the objectionably violent reciprocation of the piston arm 19. Furthermore, this change of pressure will be automatically accomplished by the action of the piston arm itself. This means that the occupants of the vehicle may enjoy a very soft ride, i.e., relatively low air pressure within the tank container, but when conditions warrant, additional higher air pressure is automatically instantly furnished. The telescoping valve means is quite sensitive and positioned only slightly above the normal position of the dome portion 20. It is used to automatically take care of rather ordinary bumps and jolts experienced on the average runway. However, most severe bumps may be experienced at times and to take care of such powerful ones, I provide my first discussed valve means. In this valve, its actuating stem 29 is at an elevation much above the valve stem 42, so that it will only be engaged by the rubber bottom 18, when the dome portion 20 has been forced to the near top of the tank container as shown by dotted lines in Fig. 3. There is no pressure regulator imposed in the pipe 28, and therefore the full pressure force of the supply tank will be released into the tank compartment to force the dome portion 20 downwardly and prevent it from striking bottom. Obviously the reciprocation of the axle 12 will be rapid and there will be a slight time lag for the air pressure in the tank compartment to equalize inside the dome portion 20 through the flexible pipe 22. The action of my device will be to snub or dampen the movement of the piston arm in both directions. When the piston arm is driven or rebounds to a lower position, the high air pressure, if not further needed, will escape through the passageways 23.

Some changes may be made in the construction and arrangement of my air suspension means for vehicles without departing from the real spirit and purpose of my invention, and it is my intention to cover by my claims, any modified forms of structure or use of mechanical equivalents which may be reasonably included within their scope.

I claim:

1. In combination, a vehicle having a chassis, a wheel axle movably secured to said chassis and a wheel on said wheel axle, an air supply tank, a tank container secured to said chassis and having a flexible wall, a piston member secured to said axle and engaging the flexible wall of said tank container, a pipe having one end communicating with the inside of said supply tank and its other end communicating with the inside of said tank container, a pressure regulator imposed in said pipe, a valve means extending into said tank container having an actuating valve stem extending toward and capable of being engaged by the flexible wall of said tank container when said piston member moves it to a predetermined position, a pipe having one end communicating with the inside of said valve means and its other end communicating with the inside of said air supply tank, an air pressure regulator imposed in said last mentioned pipe, and a means for releasing air pressure from said tank container when said piston member moves a predetermined distance away from said valve stem.

2. In combination, a vehicle having a chassis, a wheel axle movably secured to said chassis and a wheel on said wheel axle, an air supply tank, a tank container secured to said chassis and having a flexible wall, a piston member secured to said axle and engaging the flexible wall of said tank container, a pipe having one end communicating with the inside of said supply tank and its other end communicating with the inside of said tank container, a pressure regulator imposed in said pipe, a valve means extending into said tank container having an actuating valve stem extending toward and capable of being engaged by the flexible wall of said tank container when said piston member moves it to a predetermined position, a pipe having one end communicating with the inside of said valve means and its other end communicating with the inside of said air supply tank, adjustable air pressure regulator imposed in said last mentioned pipe, and a means for releasing air pressure from said tank container when said piston member moves a predetermined distance away from said valve stem.

3. In combination, a vehicle having a chassis, a wheel axle movably secured to said chassis and a wheel on said wheel axle, an air supply tank, a tank container secured to said chassis and having a flexible wall, a piston member secured to said axle and engaging the flexible wall of said tank container, a pipe having one end communicating with the inside of said supply tank and its other end communicating with the inside of said tank container, a pressure regulator imposed in said pipe, a valve means extending into said tank container having an actuating valve stem extending toward and capable of being engaged by the flexible wall of said tank container when said piston member moves it to a predetermined position, a pipe having one end communicating with the inside of said valve means and its other end communicating with the inside of said air supply tank, a second valve means extending into said tank container having an actuating valve stem extending toward and capable of being engaged by the flexible wall of said tank container when said piston member moves it to a predetermined position; one of said valve means extending into said tank container further than the other said valve means, a pipe having one end communicating with the inside of said second valve means and its other end communicating with the inside of said supply tank, a pressure regulator imposed in that pipe leading to said valve means that extends furthest into said tank container, and a means for releasing air pressure from said tank container when said piston member moves a predetermined distance away from said valve stems.

4. In combination, a vehicle having a chassis, a wheel axle movably secured to said chassis and a wheel on said wheel axle, an air supply tank, a tank container secured to said chassis and having a flexible wall, a piston member secured to said axle and engaging the flexible wall of said tank container, a pipe having one end communicating with the inside of said supply tank and its other end communicating with the inside of said tank container, a pressure regulator imposed in said pipe, a valve means extending into said tank container having an actuating valve stem extending toward and capable of being engaged by the flexible wall of said tank container when said piston member moves it to a predetermined position, a pipe having one end communicating with the inside of said valve means and its other end communicating with the inside of said air supply tank; said flexible wall of said tank container being of rubber-like material and embracing the top and side of said piston member when said piston member is in a normal supporting position; said piston member having an air exit passageway overlapped by said flexible wall when in a normal supporting position, and a conduit having one end communicating with the inside of said tank container and its other end operatively connected to the air exit passageway of said piston member.

5. In combination, a vehicle having a chassis, a wheel axle movably secured to said chassis and a wheel on said wheel axle, an air supply tank, a tank container secured to said chassis and having a flexible wall, a piston member secured to said axle and engaging the flexible wall of said tank container, a pipe having one end communicating with the inside of said supply tank and its other end communicating with the inside of said tank container, a pressure regulator imposed in said pipe, a valve means extending into said tank container having an actuating valve stem extending toward and capable of being engaged by the flexible wall of said tank container when said piston member moves it to a predetermined position, a pipe having one end communicating with the inside of said valve means and its other end communicating with the inside of said air supply tank; said flexible wall of said tank container being of rubber-like material and embracing the top and side of said piston member when said piston member is in a normal supporting position; said piston member having air exit passageways overlapped by said flexible wall when in a normal supporting position, and a conduit having one end communicating with the inside of said tank container and its other end operatively connected to the air exit passageways of said piston member.

6. In combination, a vehicle having a chassis, a wheel axle movably secured to said chassis and a wheel on said wheel axle, an air supply tank, a tank container secured to said chassis and having a flexible wall, a piston member secured to said axle and engaging the flexible wall of said tank container, a pipe having one end communicating with the inside of said supply tank and its other end communicating with the inside of said tank container, a pressure regulator imposed in said pipe, a valve means extending into said tank container having an actuating valve stem extending toward and capable of being engaged by the flexible wall of said tank container when said piston member moves it to a predetermined position, a pipe having one end communicating with the inside of said valve means and its other end communicating with the inside of said air supply tank, an adjustable air pressure regulator imposed in said pipe; said flexible wall of said tank container being of rubber-like material and embracing the top and side of said piston member when said piston member is in a normal supporting position; said piston member having an air exit passageway overlapped by said flexible wall when in a normal supporting position, and a conduit having one end communicating with the inside of said tank container and its other end operatively connected to the air exit passageway of said piston member.

References Cited in the file of this patent

UNITED STATES PATENTS

| | | |
|---|---|---|
| 1,486,911 | Messier | Mar. 18, 1924 |
| 1,641,640 | Myers | Sept. 6, 1927 |
| 2,844,385 | Pribonic | July 22, 1958 |
| 2,848,249 | Bertsch | Aug. 19, 1958 |